US007827355B1

(12) United States Patent
Muthusamy et al.

(10) Patent No.: US 7,827,355 B1
(45) Date of Patent: Nov. 2, 2010

(54) DATA PROCESSOR HAVING A CACHE WITH EFFICIENT STORAGE OF PREDECODE INFORMATION, CACHE, AND METHOD

(75) Inventors: Karthikeyan Muthusamy, Austin, TX (US); Brian D. McMinn, Buda, TX (US)

(73) Assignee: GlobalFoundries Inc., Grand Cayman (KY)

( * ) Notice: Subject to any disclaimer, the term of this patent is extended or adjusted under 35 U.S.C. 154(b) by 549 days.

(21) Appl. No.: 10/887,069

(22) Filed: Jul. 8, 2004

(51) Int. Cl.
*G06F 12/00* (2006.01)
*G06F 13/00* (2006.01)
*G06F 13/28* (2006.01)
*G06F 15/00* (2006.01)
*G06F 7/38* (2006.01)
*G06F 9/00* (2006.01)
*G06F 9/44* (2006.01)

(52) U.S. Cl. .................. 711/125; 711/113; 711/118; 712/233; 712/239; 712/240

(58) Field of Classification Search .............. 711/113, 711/118–146; 712/204, 213, 223, 233, 237, 712/239–240
See application file for complete search history.

(56) References Cited

U.S. PATENT DOCUMENTS

| 5,761,490 A * | 6/1998 | Hunt ........................... 712/239 |
| 5,875,325 A * | 2/1999 | Talcott ......................... 712/240 |
| 5,933,850 A * | 8/1999 | Kumar et al. ................ 711/125 |
| 6,260,134 B1 | 7/2001 | Zuraski, Jr. et al. |
| 6,275,927 B2 * | 8/2001 | Roberts ....................... 712/213 |
| 6,324,621 B2 * | 11/2001 | Singh et al. .................. 711/129 |
| 6,405,303 B1 | 6/2002 | Miller et al. |
| 6,502,188 B1 | 12/2002 | Zuraski, Jr. et al. |
| 2005/0268046 A1 * | 12/2005 | Heil ............................ 711/137 |

OTHER PUBLICATIONS

Actions on the Merits by the U.S.P.T.O. as of Feb. 11, 2008, 1 page.

* cited by examiner

*Primary Examiner*—Sanjiv Shah
*Assistant Examiner*—Yaima Campos
(74) *Attorney, Agent, or Firm*—Meyertons, Hood, Kivlin, Kowert & Goetzel, P.C.

(57) ABSTRACT

A data processor (200) includes an instruction cache (220) and a secondary cache (250). The instruction cache (220) has a plurality of cache lines. Each of the plurality of cache lines stores a first plurality of bits (222) corresponding to at least one instruction and a second plurality of bits (224, 226) associated with the execution of the at least one instruction. The secondary cache (250) is coupled to the instruction cache (220) and stores cache lines from the instruction cache (250) by storing the first plurality of bits (222) and a third plurality of bits (255, 257) corresponding to the second plurality of bits (224, 226). The third plurality of bits (255, 257) is fewer in number than the second plurality of bits (224, 226).

20 Claims, 3 Drawing Sheets

DATA PROCESSOR HAVING A CACHE WITH EFFICIENT STORAGE OF PREDECODE INFORMATION, CACHE, AND METHOD

CROSS REFERENCE TO RELATED APPLICATIONS

Related subject matter is contained in the following copending applications:
1. application Ser. No. 09/912,011, filed on Jul. 24, 2001, entitled "Hybrid Branch Prediction Device with Two Levels of Branch Prediction Cache" invented by Gerald D. Zuraski, Jr. and James S. Roberts and assigned to the assignee hereof.
2. application Ser. No. 10/086,131, filed on Feb. 28, 2002, entitled "Branch Markers for Rapidly Identifying Branch Prediction" invented by Gerald D. Zuraski, Jr. and assigned to the assignee hereof.

FIELD OF THE DISCLOSURE

The invention relates generally to data processors, and more particularly to data processors with caches that store both an instruction and additional information about the instruction.

BACKGROUND

A known way to increase the performance of a computer system is to include a local, high-speed memory known as a cache. A cache increases system performance because there is a high probability that once the central processing unit (CPU) has accessed a data element (either operand data usually referred to simply as "data" or instruction) at a particular address, there is a high probability it will access the same address in the future. The cache fetches and stores data that is located adjacent to the requested piece of data from a slower, main memory or lower-level cache. In very high performance computer systems, several caches may be placed in a hierarchy. The cache that is closest to the CPU, known as the upper-level or "L1" cache, is the highest-level cache in the hierarchy and is generally the fastest. Other, generally slower caches are then placed in descending order in the hierarchy starting with a secondary cache known as the "L2" cache, etc., until the lowest level cache that is connected to main memory. One well-known microprocessor architecture includes separate caches for instructions and data at the L1 level and a combined instruction and data cache at the L2 level.

Each cache line includes several bytes and other information about the bytes. For example a field called a "tag" indicates the address at which the cache line is located in memory and is used to determine whether an access "hits" or "misses" in the cache. Other useful information that characterizes the instructions or data may be stored in the cache line as well, such as error correcting code (ECC) bits and in the case of instructions, bits that characterize the instructions in the respective cache line.

These instruction characterizing bits may include predecode bits. For example one popular class of microprocessors is based on the so-called x86 instruction set first implemented by the Intel Corporation of Santa Clara, Calif. The x86 instruction set is a so-called variable length instruction set, because the length of the instruction opcodes can vary between one and fifteen bytes. In a superscalar implementation of an x86 microprocessor, it is necessary to predetermine where the instruction boundaries are in order to dispatch multiple instructions per clock cycle. However the determination of the instruction boundaries within a group of bytes is a laborious sequential process. Each instruction end must be determined before the next instruction can be examined. To facilitate multiple instruction issue without delay, this type of information is conveniently stored along with the instructions in the cache.

Another example of characterizing bits is branch prediction bits. Branch prediction bits are useful when performing speculative execution of instructions. Speculative execution involves the process of guessing whether a conditional branch will be taken. The prediction may later prove to be correct or incorrect. If the prediction is later proved to be correct, then performance is improved by immediate processing of instructions along the predicted path through the pipeline before the condition is resolved. If the prediction is later proved to be incorrect, then the pipeline must be flushed of the instructions in progress, and extra cycles will be required to "catch up". Thus, the improvement in efficiency depends on the prediction accuracy. Branch prediction bits characterize the existence of branch instructions in a group of instructions and the nature of the branch, such as unconditional versus conditional.

There is a significant space penalty when storing these extra bits in a two-level cache hierarchy. It is usually desirable to make the size of the L2 cache relatively large, such as 1 megabyte (Mbyte), and the size of the L2 cache alone can be a significant fraction of the die area of the microprocessor. Storing these additional characterizing bits in the L2 cache causes the total die size to increase significantly. What is needed is a new data processor that retains the benefit of storing the characterizing bits while reducing the size of the L2 cache.

BRIEF SUMMARY

Thus in one form the present invention provides a data processor including an instruction cache and a secondary cache. The instruction cache has a plurality of cache lines. Each of the plurality of cache lines stores a first plurality of bits corresponding to at least one instruction and a second plurality of bits associated with the execution of the at least one instruction. The secondary cache is coupled to the instruction cache and stores cache lines from the instruction cache by storing the first plurality of bits and a third plurality of bits corresponding to the second plurality of bits. The third plurality of bits is fewer in number than the second plurality of bits.

In another form the present invention provides a method for use in a data processor having an instruction cache and a secondary cache. A first plurality of bits corresponding to at least one instruction is stored in a line of the instruction cache. A second plurality of bits associated with the execution of the at least one instruction is stored in the line of the instruction cache. The first plurality of bits is moved to a line of the secondary cache. The second plurality of bits is compressed into a third plurality of bits. The third plurality of bits is fewer in number than the second plurality of bits. The third plurality of bits is stored in the secondary cache.

In yet another form the present invention provides a secondary cache for use in a data processor having an instruction cache. The secondary cache is adapted to be coupled to the instruction cache and includes a plurality of lines. Each of the plurality of lines comprises first and second fields. The first field is adapted to store a first plurality of instruction bits corresponding to at least one instruction from the instruction cache. The second field corresponds to a second plurality of bits associated with the execution of the at least one instruction. The second field stores a third plurality of bits representing some but not all of the information contained in the second plurality of bits.

In still another form the present invention provides a data processor comprising a decoder and a cache. The decoder has an output for providing a plurality of predecode bits representing a predetermined characteristic of at least one instruction. The cache includes a plurality of lines, each line including first and second fields. The first field is adapted to store at least a portion of the at least one instruction. The second field stores a plurality of compressed predecode bits. The plurality of compressed predecode bits stores some but not all of the information contained in the plurality of predecode bits.

In yet another form the present invention provides a cache suitable for use in a data processor and including a plurality of cache lines, each line including first, second, and third fields. The first field is adapted to store a first plurality of bits. The second field stores a second plurality of bits characterizing the first plurality of bits. The third field stores an indication of whether the second plurality of bits is in compressed format.

BRIEF DESCRIPTION OF THE DRAWINGS

The present disclosure may be better understood, and its numerous features and advantages made apparent to those skilled in the art by referencing the accompanying drawing, in which like reference numbers indicate similar or identical items.

DESCRIPTION OF THE PREFERRED EMBODIMENT(S)

Figure 1:
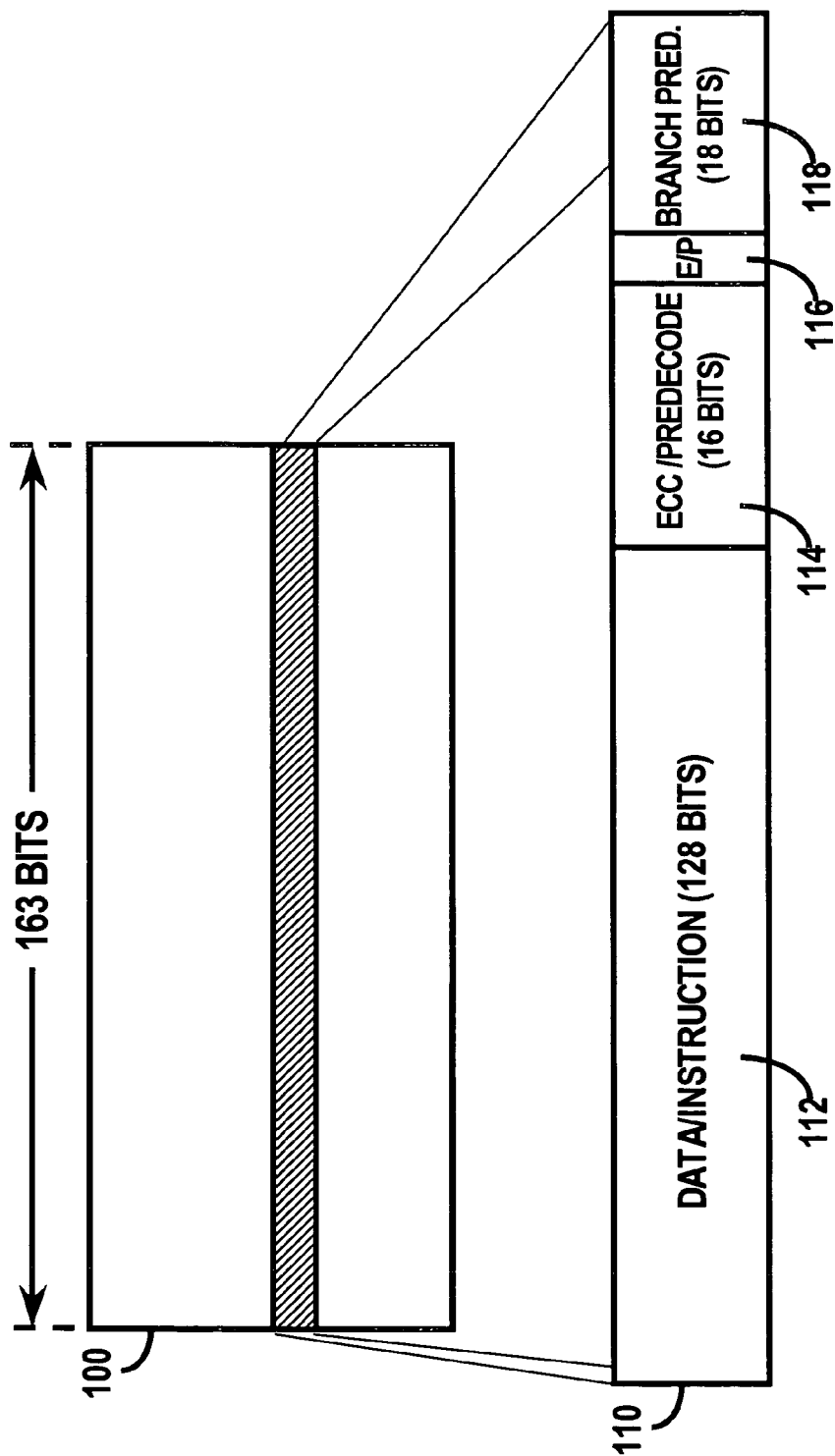
FIG. 1 illustrates in block diagram form an L2 cache known in the prior art.

FIG. 1 illustrates in block diagram form an L2 cache 100 known in the prior art. L2 cache 100 has a set of cache lines and FIG. 1 illustrates a representative cache line 110. Cache line 110 includes a 128-bit data/instruction field, a 16-bit ECC/predecode field 114, a one-bit ECC/predecode (E/P) indication field 116, and an 18-bit branch prediction field 118. Ignoring the corresponding tag bits, each cache line in L2 cache 100 is 163 bits in length, of which 128 bits are data or instruction bits depending on whether the line is associated with the data or the instruction cache at the L1 level. The remaining bits include useful information about the data or instructions. The E/P bit indicates whether the ECC/predecode field 114 stores a 16-bit ECC in the case of data or 16 predecode bits in the case of instructions. Finally the branch prediction field stores 18 branch prediction bits. If line 110 stores a line of data from the data cache, branch prediction field 118 is not used.

L2 cache 100 thus stores an extra 35 bits per cache line. The retention and storage of these bits improves the performance of the microprocessor when the line that was evicted from the L1 cache is again required by the program. It saves the time that would otherwise be required to predecode the instruction boundaries and decode information about branch instructions. However since L2 cache 100 is preferably quite large, such as 1 Mbyte, storing the extra bits requires a substantial amount of integrated circuit area.

The inventors have discovered that these extra bits can be compressed into fewer bit positions, saving substantial area. Furthermore the compression can take one of two forms selected according to the usage of the bits.

First some bits, namely the predecode bits, represent information that must be exactly correct before the corresponding instruction or instructions can be dispatched. For better performance the predecode field can be compressed by discarding some information that can be quickly re-created when the line is again loaded into the instruction cache. An algorithm for compression and decompression that avoids the long sequential process of parsing instruction boundaries will be described further below.

Second other bits, namely the branch prediction bits, need not be exactly correct because the only consequence of discarding them is lower processing efficiency. Additional branch prediction bits help to speculatively execute correct program threads, but obey a law of diminishing returns for each additional branch instruction that may be in a given cache line and for extra bits for discriminating the type of branch. Thus the 18 branch prediction bits can be represented in a fewer number of bits that preserves a substantial majority of the benefit of the 18 bits.

Figure 2:
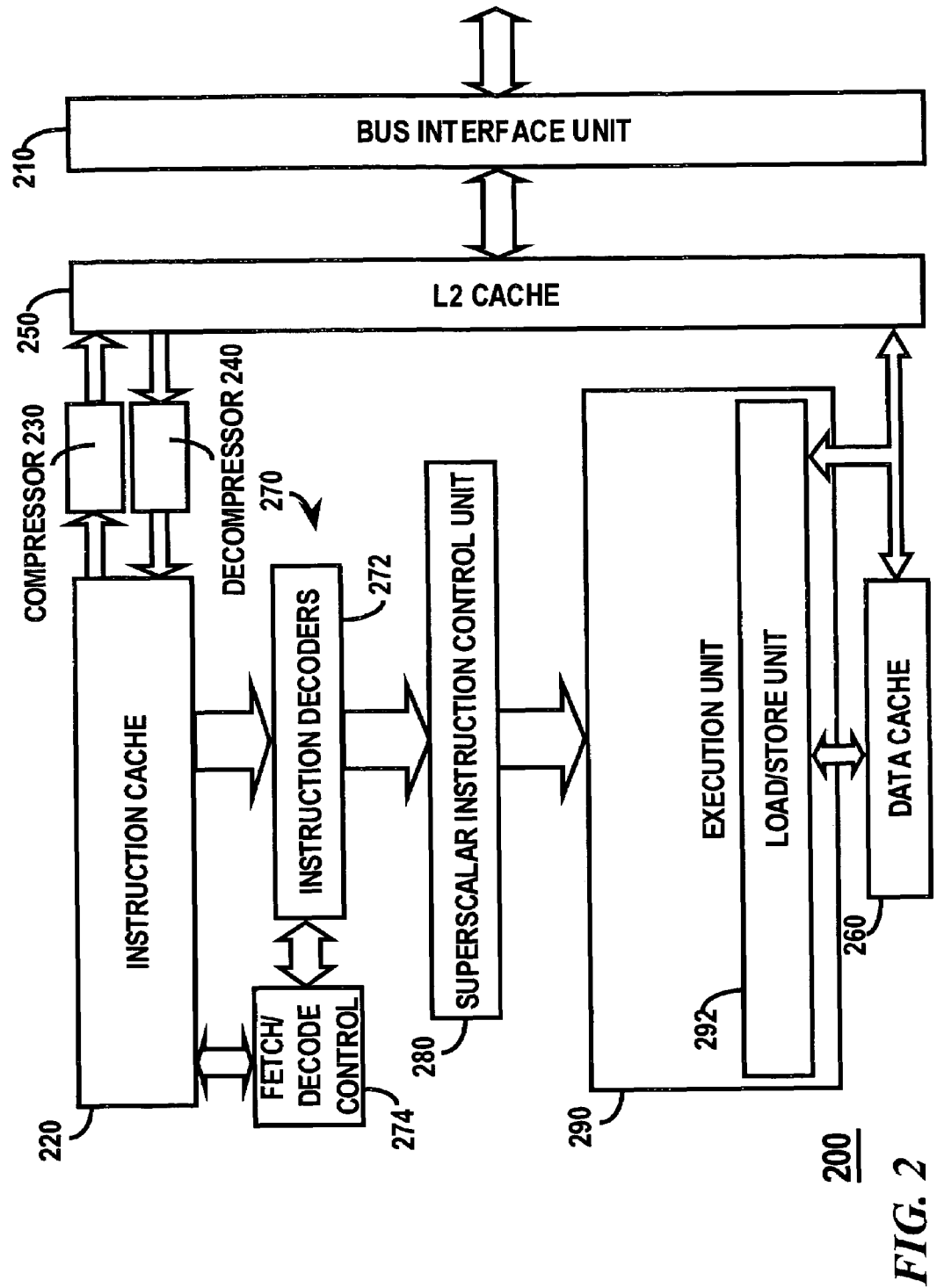
FIG. 2 illustrates in block diagram form a data processor according to the present invention.

The inventors have used these discoveries as shown in FIG. 2, which illustrates in block diagram form a data processor 200 according to the present invention. Data processor 200 is in the form of a single-chip microprocessor and includes generally a bus interface unit 210, an instruction cache 220, a compressor 230, a decompressor 240, and L2 cache 250, a decoder 270, a superscalar instruction control unit 280, and an execution unit 290.

Bus interface unit 210 has a bi-directional connection to an external memory system. This external memory system may be in the form of a memory controller associated with a circuit commonly called a "Northbridge". The Northbridge may be off-chip but is preferably integrated with data processor 200 on the same chip. Bus interface unit 210 is responsible for initiating and controlling all memory accesses with the Northbridge and providing an instruction stream to instruction cache 220 from the external memory system. It is also responsible for performing accesses to store or fetch required data from the memory system and to both provide the data to data cache 260 and forward operands to a load/store unit 292 for immediate use.

Instruction cache 220 is an L1 cache that is dedicated to storing instructions. Thus it provides a stream of multiple instructions as requested by decoder 270 based on program flow. It also provides instructions that are being evicted so that they may be stored in L2 cache 250. Note that the cache compression system disclosed here is applicable to other cache systems such as those with separate instruction and data caches at the L2 level. However the benefits of compression are especially useful in a combined instruction/data cache because the set of compressed bits characterizing the instructions can for the most part fit into extra bits already present for data.

Instructions are stored in L2 cache 250 from instruction cache 220 by means of a compressor 230, and retrieved from L2 cache 250 and stored in instruction cache 220 by means of a decompressor 240. The operation of compressor 230 and decompressor 240 will be explained in greater detail below.

Decoder 270 is responsible for supplying decoded instructions to superscalar instruction control unit 280 and includes a set of instruction decoders 272 and a fetch/decode control block 274. Fetch/decode control block 274 accesses instruction cache 220 to provide instructions for decode to instruction decoders 272 by predicting program flow using branch prediction techniques. It also provides predecoded information to fetch/decoder control block 274 for storage back into instruction cache 220.

Superscalar instruction control unit 280 receives the decoded instructions and dispatches them to appropriate ones of multiple functional units in execution unit 290. It also retires instruction after they are completed by the appropriate functional unit and commits the results to the architectural state of data processor 200.

Execution unit 290 includes multiple functional units. In execution unit 290 the functional units are broken down into two groups, integer functions units and floating point functional units. The composition and operation of these functional units is not relevant to understanding the present invention and will not be discussed further.

One particular functional unit of interest is a load/store unit 292. Load/store unit 292 accesses data cache 260 to fetch and store data operands as directed by the program. In addition it is coupled to bus interface unit 210, which forwards operands requested by the program flow while simultaneously storing them in data cache 260.

Most of the details of data processor 200 are not relevant to the invention. However the fact that data processor 200 is a superscalar processor implementing a variable length instruction set is significant because it requires the boundaries of the variable length instructions to be determined prior to the instructions being dispatched. In this regard note that data processor 200 executes instructions of the x86 instruction set.

The details of the compressed instruction storage in L2 cache 250 will now be explained with reference to FIG. 3, which illustrates in block diagram form a portion 300 of data processor 200 of FIG. 2 including instruction cache 220, L2 cache 250, compressor 230 formed by compressor circuits 232 and 234, and decompressor 240 formed by decompressor circuits 242 and 244. Instruction cache 220 includes a plurality of lines storing, for example 64 Kbytes of instructions along with additional bits associated with the at least one instruction stored in the corresponding cache line. Thus each line in instruction cache 220 includes a 128-bit instruction field 222, a 16-bit predecode field 224, and an 18-bit branch prediction field 226. Instruction field 222 stores 16 instruction bytes. In the x86 instruction set, instructions can be from one to fifteen bytes in length. Thus these 16 instruction bytes correspond to two or more instructions, depending on their lengths. Due to the variable length nature of the x86 instruction set, the instruction field of any given instruction cache line may not include any complete instruction, but there will always be at least one instruction that ends somewhere in the cache line. In other embodiments with different line size, not all lines will include instruction ends, but some will.

Predecode field 224 indicates the length or lengths of the instructions or portions of instructions in the instruction field of the corresponding cache line. It indicates the length or lengths by indicating an ending position of the instructions. Predecode field 224 stores 16 bits in which a zero indicates that a corresponding one of the 16 bytes in instruction field 222 is not the last byte of an instruction, and a one indicates that the corresponding byte is the last byte of the instruction. These bits allow instruction decoders 270 to parse the instructions so that superscalar instruction control unit 280 can dispatch several instructions per clock cycle. Branch prediction field 226 stores 18 bits for implementing branch prediction. These bits include bits for the type of branch (forward, backward, conditional, absolute, etc.) and the taken/not taken history. If the branch is correctly predicted, then the program is able to execute instructions down the predicted path before the branch is resolved. If the branch is incorrectly predicted, then the processor "backs up" and the results obtained during execution of instructions down the mispredicted path are discarded. In either case program operation is correct, but with lower processing efficiency in the case of a mispredicted branch.

L2 cache 250 includes a plurality of lines for storing, for example, 1 Mbyte of instructions and data, along with additional bits associated with either instructions or data in the corresponding cache line. L2 cache 250 includes a 128-bit instruction field 254, a 10-bit ECC/compressed predecode field 255, a 1-bit E/P field 256, and an 8-bit ECC/compressed branch prediction field 257. The use of fields 255-257 can be further understood from the description of the compression and decompression processes below.

Figure 3:
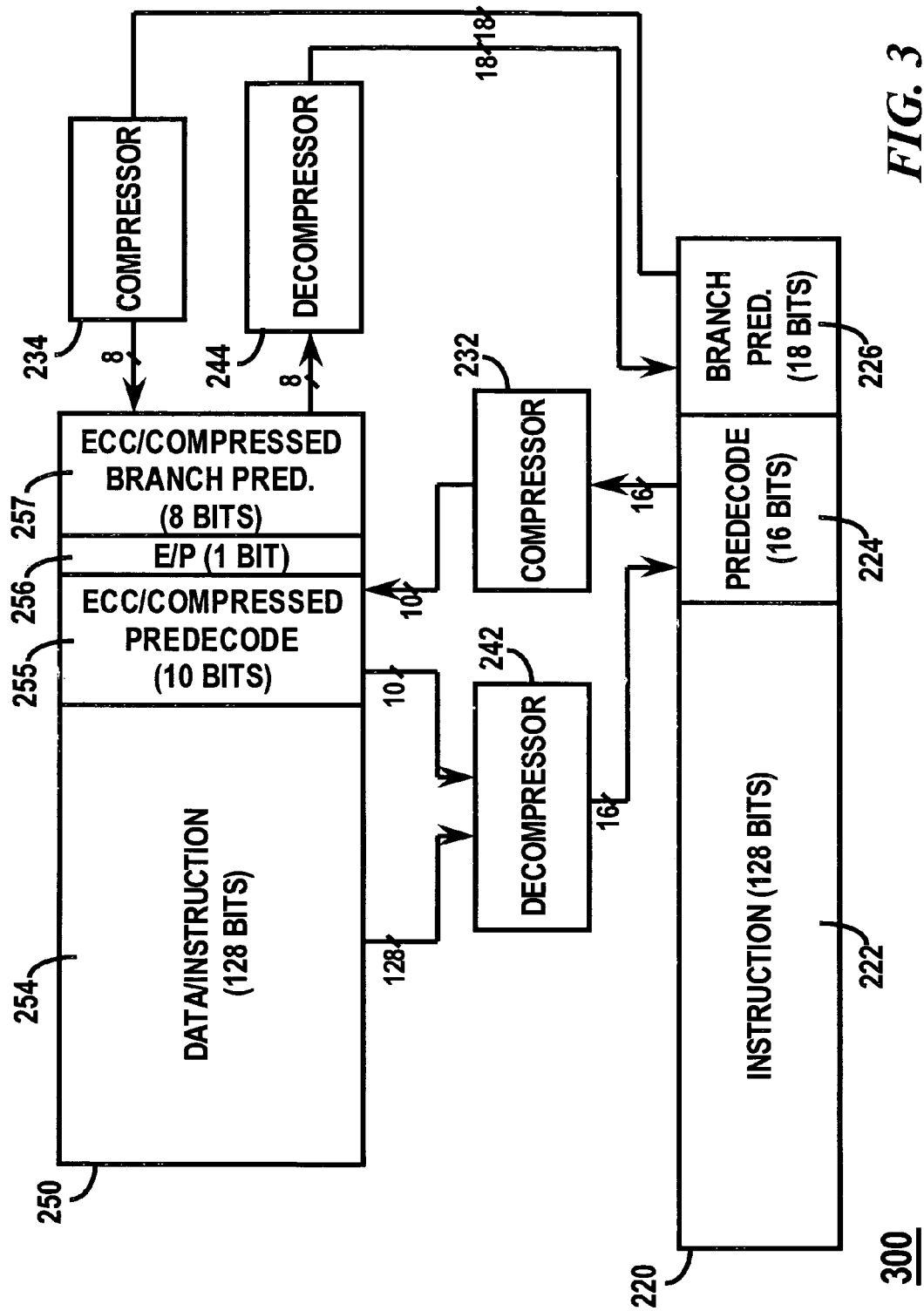
FIG. 3 illustrates in block diagram form a portion of the data processor of FIG. 2.

FIG. 3 illustrates that compressor 230 of FIG. 2 is formed by a first compressor circuit 232 and a second compressor circuit 234. Compressor circuit 232 has an input connected to the output of predecode field 224, and an output connected to ECC/compressed predecode field 255. Compressor circuit 232 discards some of the bits of predecode field 224 that may be easily recreated when the line is returned to another line in instruction cache 220 without sequential processing. The algorithm it uses will now be described. Compressor 232 examines two groups of eight predecode bits and compresses each group of eight bits into a corresponding compressed field of five bits. The encoding scheme is shown in TABLE I below:

TABLE I

| EndBits [7:0] | Encoding (4:0) | Explanation of indeterminate fields |
|---|---|---|
| 00000000 | 00000 | |
| 00000xx1 | 00001 | xx indicates 1- or 2-byte opcodes in 1 and 2 |
| 0000xx10 | 00010 | xx indicates 1- or 2-byte opcodes in 2 and 3 |
| 000xx100 | 00011 | xx indicates 1- or 2-byte opcodes in 3 and 4 |
| 00xx1000 | 00100 | xx indicates 1- or 2-byte opcodes in 4 and 5 |
| 0xx10000 | 00101 | xx indicates 1- or 2-byte opcodes in 5 and 6 |
| xx100000 | 00110 | xx indicates 1- or 2-byte opcodes in 6 and 7 |
| x1000000 | 00111 | x indicates one-byte opcode in 7 |
| 10000000 | 01000 | |
| 00xx1xx1 | 01001 | xx indicates 1- or 2-byte opcodes in 1-2 and 4-5 |
| 0xx10xx1 | 01010 | xx indicates 1- or 2-byte opcodes in 1-2 and 5-6 |
| xx100xx1 | 01011 | xx indicates 1- or 2-byte opcodes in 1-2 and 6-7 |
| x1000xx1 | 01100 | xx indicates 1- or 2-byte opcodes in 1-2 and 7 |
| 10000xx1 | 01101 | xx indicates 1- or 2-byte opcodes in 1-2 |
| 0xx1xx10 | 01110 | xx indicates 1- or 2-byte opcodes in 3-4 and 5-6 |
| xx10xx10 | 01111 | xx indicates 1- or 2-byte opcodes in 3-4 and 6-7 |
| X100xx10 | 10000 | xx indicates 1- or 2-byte opcodes in 3-4 and 7 |
| 1000xx10 | 10001 | xx indicates 1- or 2-byte opcodes in 3-4 |
| xx1xx100 | 10010 | xx indicates 1- or 2-byte opcodes in 3-4 and 6-7 |
| x10xx100 | 10011 | xx indicates 1- or 2-byte opcodes in 3-4 and 7 |
| 100xx100 | 10100 | xx indicates 1- or 2-byte opcodes in 3-4 |
| x1xx1000 | 10101 | xx indicates 1- or 2-byte opcodes in 4-5 and 7 |
| 10xx1000 | 10110 | xx indicates 1- or 2-byte opcodes in 4-5 |
| 1xx10000 | 10111 | xx indicates 1- or 2-byte opcodes in 5-6 |
| x1xx1xx1 | 11000 | xx indicates 1- or 2-byte opcodes in 1-2/4-5/7 |
| 1xx1xx10 | 11001 | xx indicates 1- or 2-byte opcodes in 3-4 and 5-6 |
| 1xx10xx1 | 11010 | xx indicates 1- or 2-byte opcodes in 1-2 and 5-6 |
| 10xx1xx1 | 11011 | xx indicates 1- or 2-byte opcodes in 1-2 and 4-5 | in which xx represents a value determined by the instruction bits in the corresponding byte positions as follows: 00 represents no one-byte opcodes in either byte; 01 represents a one-byte opcode in the less significant byte and no one-byte opcode in the more significant byte; 10 represents a two-byte opcode that starts in the less significant byte and ends in the more significant byte; and 11 represents one-byte opcodes in both byte positions.

Decompressor 242 decompresses the compressed predecode bits by mapping the 5-bit field to the corresponding 8-bit field and performing one-byte and two-byte opcode determinations using simple combinatorial logic on the corresponding bits. Thus the reconstruction of the extra information can be done without delaying instruction processing when the line is returned from the L2 cache as required by the program.

Compressor 234 performs a similar operation on the branch prediction bits except that it is a lossy compression. The branch prediction bits are defined as follows. The first nine bits are used to mark branches in a 16-byte cache line along with three end adjustment bits to indicate whether each of up to three branches ends on an even byte or an odd byte. Within this nine-bit field the first bit marks a branch at byte 0; the ninth bit marks a branch at byte 15; and intermediate bits mark a branch at either of two adjacent bytes. For example, bit one marks a branch at either byte one or byte two; bit two marks a branch at either byte three or byte four; and so on. This kind of encoding is possible since almost all the branches in the x86 instruction set are at least two bytes long, and missing a rare case in which a two-byte branch is followed by a one-byte branch is acceptable. Finally there are six bits in which pairs of bits indicate the type of branch for each of up to three branches in the 16-byte cache line. These pairs are encoded as follows: 00 indicates an always taken jump; 01 indicates a dynamic branch; 10 indicates a call; and 11 indicates a return. A branch is marked dynamic if it is a conditional relative branch that was taken initially and later executed as non-taken.

The inventors discovered running benchmark programs that about 90% of the time there is only one branch within a 16-byte cache line, and about 99% of the time there are two or fewer branches. Thus the inventors realized that most of the performance could be retained by saving information for only up to two branches, while suffering rare performance penalties for lines with three or more branches.

The branch prediction compression scheme compresses the nine-bit field as shown in TABLE II:

TABLE II

| Branch marker bits [8:0] | Brn1 Dynamic | Brn2 Dynamic | Brn3 Dynamic | Encoding [5:0] |
|---|---|---|---|---|
| 0_0000_0000 | x | x | x | 000000 |
| 0_0000_0001 | x | x | x | 000001 |
| 0_0000_0010 | x | x | x | 000010 |
| 0_0000_0100 | x | x | x | 000011 |
| 0_0000_1000 | x | x | x | 000100 |
| 0_0001_0000 | x | x | x | 000101 |
| 0_0010_0000 | x | x | x | 000110 |
| 0_0100_0000 | x | x | x | 000111 |
| 0_1000_0000 | x | x | x | 001000 |
| 1_0000_0000 | x | x | x | 001001 |
| 0_0000_0011 | x | x | x | 001010 |
| 0_0000_0101 | x | x | x | 001011 |
| 0_0000_1001 | x | x | x | 001100 |
| 0_0001_0001 | x | x | x | 001101 |
| 0_0010_0001 | x | x | x | 001110 |
| 0_0100_0001 | x | x | x | 001111 |
| 0_1000_0001 | x | x | x | 010000 |
| 1_0000_0001 | x | x | x | 010001 |
| 0_0000_0110 | x | x | x | 010010 |
| 0_0000_1010 | x | x | x | 010011 |
| 0_0001_0010 | x | x | x | 010100 |
| 0_0010_0010 | x | x | x | 010101 |
| 0_0100_0010 | x | x | x | 010110 |
| 0_1000_0010 | x | x | x | 010111 |
| 1_0000_0010 | x | x | x | 011000 |
| 0_0000_1100 | x | x | x | 011001 |
| 0_0001_0100 | x | x | x | 011010 |
| 0_0010_0100 | x | x | x | 011011 |
| 0_0100_0100 | x | x | x | 011100 |
| 0_1000_0100 | x | x | x | 011101 |

TABLE II-continued

| Branch marker bits [8:0] | Brn1 Dynamic | Brn2 Dynamic | Brn3 Dynamic | Encoding [5:0] |
|---|---|---|---|---|
| 1_0000_0100 | x | x | x | 011110 |
| 0_0001_1000 | x | x | x | 011111 |
| 0_0010_1000 | x | x | x | 100000 |
| 0_0100_1000 | x | x | x | 100001 |
| 0_1000_1000 | x | x | x | 100010 |
| 1_0000_1000 | x | x | x | 100011 |
| 0_0011_0000 | x | x | x | 100100 |
| 0_0101_0000 | x | x | x | 100101 |
| 0_1001_0000 | x | x | x | 100110 |
| 1_0001_0000 | x | x | x | 100111 |
| 0_0110_0000 | x | x | x | 101000 |
| 0_1010_0000 | x | x | x | 101001 |
| 1_0010_0000 | x | x | x | 101010 |
| 0_1100_0000 | x | x | x | 101011 |
| 1_0100_0000 | x | x | x | 101100 |
| 1_1000_0000 | x | x | x | 101101 |

The compressed encoding includes six encoded branch marker bits and two other bits. The two other bits hold the following information. If there is only one branch, then they encode two bits of information for that branch to select between a CALL instruction, a RET (return) instruction, a static branch, and a dynamic branch. If there are two branches (after dropping the third branch when necessary), each bit indicates whether the corresponding branch is a static branch or a dynamic branch. Since it takes a long time to determine whether a branch is static or dynamic, that information is more important to retain.

Thus two compression examples for storing fewer bits in the L2 cache have been shown. In one case (predecode bits), it was advantageous to re-create the predecode field exactly when the instruction was returned to the instruction cache. The compressed bits were remapped and fields that could easily be decoded from the instructions themselves in a fast combinatorial decode step were reconstructed. In another case (branch prediction bits), the bits did not need to be recreated exactly for correct program operation. Some of the information was discarded, but the bits that contributed to most of the useful branch prediction were retained. It should be apparent that other types of information about the instructions could be stored in a compressed form in the L2 cache as well.

The additional fields are considered to be stored in the same line of the cache. However note that they are considered to be stored in the line by association with the one or more instructions in that line, regardless of the physical structure used to hold the additional information. For example the additional information could be stored in a separate table that associates it with the corresponding line of the cache. Note also that the predecode bits can indicate the length of the variable length instruction or instructions in the cache line by indicating the starting location rather than the ending location.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A data processor comprising:
    a first cache comprising a first line, wherein the first line includes a first field that stores a first data representative of a set of one or more instructions and a second field that stores bits representing branch prediction information for the set of one or more instructions; and
    a compressor configured to:
        obtain a first set of bits representing a first branch prediction information for the set of one or more instructions, wherein the first branch prediction information represents, for each branch instruction of the set of one or more instructions, a branch type of the branch instruction and taken or not taken history information, the branch type comprising one selected from a call instruction type; a return instruction type; a static branch type; and a dynamic branch type; and
        compress the first set of bits to generate a second set of bits for storage in the second field, the second set of bits representing a second branch prediction information for the set of one or more instructions, the second branch prediction information comprising only a subset of the first branch prediction information and the second set of bits comprising fewer bits than the first set of bits, wherein the second branch prediction information represents, for each branch instruction of the set of one or more instructions, whether the branch instruction is a static branch or a dynamic branch.

2. The data processor of claim 1, wherein each bit of the second set of bits is associated with a corresponding branch instruction of the subset of the branch instructions and represents whether the corresponding branch instruction is a static branch or a dynamic branch.

3. The data processor of claim 1, wherein the compressor is configured to generate the second set of bits so as to represent branch prediction information for only a subset of the branch instructions of the set of one or more instructions in response to determining a number of branch instructions in the set of one or more instructions is greater than a select number.

4. The data processor of claim 3, wherein the compressor is configured to generate the second set of bits so as to represent a type of branch of each branch instruction in the set of one or more instructions in response to determining the number of branch instructions in the set of one or more instructions is not greater than the select number.

5. The data processor of claim 4, wherein the type of branch of each branch instruction comprises one selected from a group consisting of: a call instruction type; a return instruction type; a static branch type; and a dynamic branch type.

6. A method comprising:
    storing a first data representative of a set of one or more instructions at a first field of a first line of a first cache;
    receiving a first set of bits representing a first branch prediction information for the set of one or more instructions, wherein the first branch prediction information represents, for each branch instruction of the set of one or more instructions, a branch type of the branch instruction and taken or not taken history information, the branch type comprising one selected from a call instruction type; a return instruction type; a static branch type; and a dynamic branch type; and
    generating a second set of bits for storage at a second field of the first line of the first cache, the second set of bits representing a second branch prediction information for the set of one or more instructions, the second branch prediction information comprising only a subset of the first branch prediction information and the second set of bits comprising fewer bits than the first set of bits, wherein the second branch prediction information represents, for each branch instruction of the set of one or more instructions, whether the branch instruction is a static branch or a dynamic branch.

7. The method of claim 6, wherein each bit of the second set of bits is associated with a corresponding branch instruction of the subset of the branch instructions and represents whether the corresponding branch instruction is a static branch or a dynamic branch.

8. The method of claim 6, wherein generating the second set of bits comprises generating the second set of bits so as to represent branch prediction information for only a subset of the branch instructions of the set of one or more instructions in response to determining a number of branch instructions in the set of one or more instructions is greater than a select number.

9. The method of claim 8, wherein generating the second set of bits generating the second set of bits so as to represent a type of branch of each branch instruction in the set of one or more instructions in response to determining the number of branch instructions in the set of one or more instructions is not greater than the select number.

10. The method of claim 9, wherein the type of branch of each branch instruction comprises one selected from a group consisting of: a call instruction type; a return instruction type; a static branch type; and a dynamic branch type.

11. A data processor comprising:
    a first cache comprising a first line, wherein the first line includes a first field that stores a first data representative of a set of one or more instructions and a second field that stores bits representing branch prediction information for the set of one or more instructions; and
    a compressor configured to:
    obtain a first set of bits representing a first branch prediction information for the set of one or more instructions, the first branch prediction information comprising a first amount of branch prediction information for each branch instruction of the set of one or more instructions and the first amount of branch prediction information for each branch instruction representing a branch type of the branch instruction and taken or not taken history information, the branch type comprising one selected from a call instruction type; a return instruction type; a static branch type; and a dynamic branch type; and
    compress the first set of bits to generate a second set of bits for storage in the second field, the second set of bits representing a second branch prediction information for the set of one or more instructions, the second branch prediction information comprising only a subset of the first branch prediction information and the second set of bits comprising fewer bits than the first set of bits, the second branch prediction information comprising a second amount of branch prediction information for each branch instruction of the set of one or more instructions, the second amount less than the first amount and the second amount of branch prediction information for each branch instruction represents whether the branch instruction is a static branch or a dynamic branch.

12. The data processor of claim 11, wherein each bit of the second set of bits is associated with a corresponding branch instruction of the subset of the branch instructions and represents whether the corresponding branch instruction is a static branch or a dynamic branch.

13. The data processor of claim 11, wherein the compressor is further configured to generate the second set of bits to represent branch prediction information for only a subset of the branch instructions of the set of one or more instructions in response to determining a number of branch instructions in the set of one or more instructions is greater than a select number.

14. The data processor of claim 13, wherein the compressor is further configured to generate the second set of bits to represent a type of branch of each branch instruction in the set of one or more instructions in response to determining the number of branch instructions in the set of one or more instructions is not greater than the select number.

15. The data processor of claim 14, wherein the type of branch of each branch instruction comprises one selected from a group consisting of: a call instruction type; a return instruction type; a static branch type; and a dynamic branch type.

16. A method comprising:
   storing a first data representative of a set of one or more instructions at a first field of a first line of a first cache;
   receiving a first set of bits representing a first branch prediction information for the set of one or more instructions, the first branch prediction information comprising a first amount of branch prediction information for each branch instruction of the set of one or more instructions and the first amount of branch prediction information for each branch instruction representing a branch type of the branch instruction and taken or not taken history information, the branch type comprising one selected from a call instruction type; a return instruction type; a static branch type; and a dynamic branch type; and
   generating a second set of bits for storage at a second field of the first line of the first cache, the second set of bits representing a second branch prediction information for the set of one or more instructions, the second branch prediction information comprising only a subset of the first branch prediction information and the second set of bits comprising fewer bits than the first set of bits, the second branch prediction information comprising a second amount of branch prediction information for each branch instruction of the set of one or more instructions, the second amount less than the first amount and the second amount of branch prediction information for each branch instruction represents whether the branch instruction is a static branch or a dynamic branch.

17. The method of claim 16, wherein each bit of the second set of bits is associated with a corresponding branch instruction of the subset of the branch instructions and represents whether the corresponding branch instruction is a static branch or a dynamic branch.

18. The method of claim 16, wherein generating the second set of bits includes generating the second set of bits so as to represent branch prediction information for only a subset of the branch instructions of the set of one or more instructions in response to determining a number of branch instructions in the set of one or more instructions is greater than a select number.

19. The method of claim 18, wherein generating the second set of bits includes generating the second set of bits so as to represent a type of branch of each branch instruction in the set of one or more instructions in response to determining the number of branch instructions in the set of one or more instructions is not greater than the select number.

20. The method of claim 19, wherein the type of branch of each branch instruction comprises one selected from a group consisting of: a call instruction type; a return instruction type; a static branch type; and a dynamic branch type.

\* \* \* \* \*